United States Patent
Sano et al.

(10) Patent No.: US 9,601,802 B2
(45) Date of Patent: Mar. 21, 2017

(54) NONAQUEOUS ELECTROLYTE FOR LITHIUM-ION SECONDARY BATTERY CONTAINING VANADIUM AND LITHIUM-ION SECONDARY BATTERY CONTAINING SAME

(71) Applicant: TDK CORPORATION, Tokyo (JP)

(72) Inventors: Atsushi Sano, Tokyo (JP); Keitaro Otsuki, Tokyo (JP); Keiichi Fukuda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 645 days.

(21) Appl. No.: 13/846,399

(22) Filed: Mar. 18, 2013

(65) Prior Publication Data
US 2013/0260226 A1    Oct. 3, 2013

(30) Foreign Application Priority Data

Mar. 27, 2012 (JP) ................. 2012-070951
Mar. 13, 2013 (JP) ................. 2013-050351

(51) Int. Cl.
| | |
|---|---|
| H01M 10/056 | (2010.01) |
| H01M 4/134 | (2010.01) |
| H01M 10/0525 | (2010.01) |
| H01M 4/58 | (2010.01) |
| H01M 10/0567 | (2010.01) |
| H01M 10/0569 | (2010.01) |

(52) U.S. Cl.
CPC ......... *H01M 10/056* (2013.01); *H01M 4/134* (2013.01); *H01M 4/5825* (2013.01); *H01M 10/0525* (2013.01); *H01M 10/0567* (2013.01); *H01M 10/0569* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 8,734,987 B2 | 5/2014 | Sano et al. | |
| 2003/0113636 A1* | 6/2003 | Sano | H01M 4/131 429/330 |
| 2007/0248520 A1* | 10/2007 | Faulkner | C01B 25/45 423/306 |
| 2009/0130556 A1* | 5/2009 | Kawashima | 429/200 |
| 2010/0081058 A1 | 4/2010 | Sano et al. | |
| 2011/0217598 A1 | 9/2011 | Kawashima et al. | |
| 2011/0311868 A1* | 12/2011 | Sano et al. | 429/211 |
| 2013/0095391 A1 | 4/2013 | Baba et al. | |

FOREIGN PATENT DOCUMENTS

| | | |
|---|---|---|
| CN | 101662019 A | 3/2010 |
| CN | 101714633 A | 5/2010 |
| JP | A 61-88466 | 5/1986 |
| JP | A 5-6778 | 1/1993 |
| JP | A 2004-303527 | 10/2004 |
| JP | A-2005-158725 | 6/2005 |
| JP | A-2012-4045 | 1/2012 |
| JP | A-2013-77424 | 4/2013 |

\* cited by examiner

*Primary Examiner* — Ula C Ruddock
*Assistant Examiner* — Tony Chuo
(74) *Attorney, Agent, or Firm* — Oliff PLC

(57) ABSTRACT

A nonaqueous electrolyte for a lithium-ion secondary battery containing 0.1 ppm to 20 ppm of vanadium in terms of vanadium ions, and containing cyclic carbonate and chain carbonate is used.

5 Claims, 1 Drawing Sheet

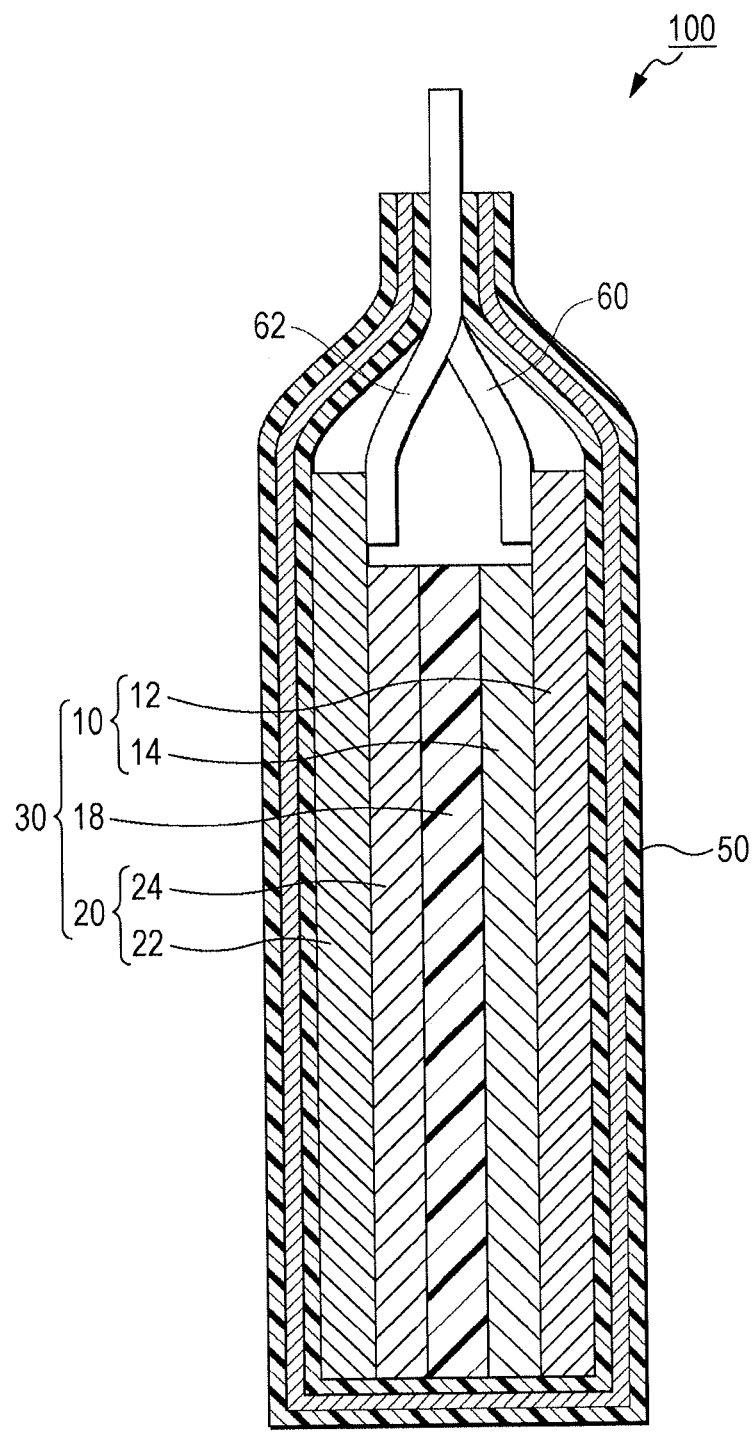

NONAQUEOUS ELECTROLYTE FOR LITHIUM-ION SECONDARY BATTERY CONTAINING VANADIUM AND LITHIUM-ION SECONDARY BATTERY CONTAINING SAME

BACKGROUND OF THE INVENTION

1. Field of the Invention

The present invention relates to a nonaqueous electrolyte for a lithium-ion secondary battery and a lithium-ion secondary battery.

2. Description of the Related Art

In the related art, as a positive electrode material (positive electrode active material) of a lithium-ion secondary battery, a laminar compound such as $LiCoO_2$ or $LiNi_{1/3}Mn_{1/3}Co_{1/3}O_2$ or a spinel compound such as $LiMn_2O_4$ has been used. In recent years, a compound with an olivine structure represented by $LiFePO_4$ has been focused on. It is known that a positive electrode material having an olivine structure has high thermal stability at a high temperature, and high security.

However, in the lithium-ion secondary battery using $LiFePO_4$, there are problems in that charging/discharging voltage is low as about 3.5 V and energy density is low. Accordingly, as a phosphoric based positive electrode material which can realize high charging/discharging voltage, $LiCoPO_4$, $LiNiPO_4$, or the like has been proposed. However, even in a case of the lithium-ion secondary battery using the positive electrode materials, sufficient capacity is not obtained. Among the phosphoric based positive electrode material, as a compound which can realize 4 V charging/discharging voltage, vanadium phosphate having a structure of $LiVOPO_4$ or $Li_3V_2(PO_4)_3$ or $LiMnPO_4$ has been known.

In the positive electrode material of the related art, there has been a problem of swelling of lithium-ion secondary battery due to gas generation, in general. In addition, it has not been known that the gas generation occurs in the lithium-ion secondary battery using the phosphate compound, however, in practice, gas is generated, the lithium-ion secondary battery is swollen, and shape stability degradation problem occurs. In particularly, in a case of using a metal laminated exterior package, shape change is significant.

For example, Japanese Unexamined Patent Application Publication Nos. 2004-303527, 61-88466, and 5-6778 disclose about vanadium phosphate, however, do not disclose about the problem of gas generation. JP-A-61-88466 discloses about addition of vanadium salt in an electrolyte, however, does not disclose about the problem of gas generation.

JP-A-5-6778 discloses about suppression of gas generation of a battery, however, it was insufficient for countermeasure of gas generation in a case of using the positive electrode materials.

SUMMARY OF THE INVENTION

Accordingly, it is an object of the present invention to provide a nonaqueous electrolyte for a lithium-ion secondary battery and a lithium-ion secondary battery which can suppress gas generation of the lithium-ion secondary battery.

A nonaqueous electrolyte for a lithium-ion secondary battery according to the present invention contains 0.1 ppm to 20 ppm of vanadium in terms of vanadium ions, and contains cyclic carbonate and chain carbonate.

By using the nonaqueous electrolyte for a lithium-ion secondary battery according to the present invention, it is possible to suppress gas generation of the lithium-ion secondary battery.

In a lithium-ion secondary battery according to the present invention includes a positive electrode which includes a positive electrode active material which intercalates and deintercalates lithium by oxide reduction reaction of transition metal, a negative electrode which can intercalate and deintercalate lithium, and the electrolyte which contains 0.1 ppm to 20 ppm of vanadium in terms of vanadium ions and contains cyclic carbonate and chain carbonate. Accordingly, it is possible to suppress gas generation of the lithium-ion secondary battery.

In the lithium-ion secondary battery according to the present invention, the electrolyte to which vanadium is added and in which concentration of vanadium is set as 0.1 ppm to 20 ppm is used, and vanadium phosphate ($Li_a(M)_b(PO_4)_cF_d$ (M=VO or V, $0.9 \leq a \leq 3.3$, $0.9 \leq b \leq 2.2$, $0.9 \leq c \leq 3.3$, and $0 \leq d \leq 2.0$)) is used as the positive electrode active material. Accordingly, it is possible to significantly suppress gas generation of the lithium-ion secondary battery.

According to the present invention, it is possible to provide a nonaqueous electrolyte for a lithium-ion secondary battery and a lithium-ion secondary battery which can suppress gas generation.

BRIEF DESCRIPTION OF THE DRAWINGS

FIG. 1 is a schematic cross-sectional view of a lithium-ion secondary battery according to the embodiment.

DESCRIPTION OF THE PREFERRED EMBODIMENTS

Hereinafter, the preferred embodiment of the present invention will be described with reference to the drawing. In addition, the present invention is not limited to the following embodiment. Constitute elements described below are constitute elements which can be easily assumed by a person skilled in the art which are substantially the same constitute elements. Further, the constitute elements described below can be suitably combined with each other.

Hereinafter, a method of manufacturing of a nonaqueous electrolyte for a lithium-ion secondary battery according to one embodiment of the present invention will be described.

As the electrolyte, an electrolyte obtained by dissolving lithium salt in a nonaqueous solvent (organic solvent) is used. As the lithium salt, salt such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$ $LiN(CF_3CF_2CO)_2$, or LiBOB can be used, for example. In addition, the salts may be used as one type alone, or may be used in combination of two or more types.

In addition, as the organic solvent, a mixture of cyclic carbonate and chain carbonate can be used. As the cyclic carbonate, propylene carbonate, ethylene carbonate, fluoroethylene carbonate, or the like is preferably used, and as the chain carbonate, diethyl carbonate, dimethyl carbonate, methyl ethyl carbonate, or the like is preferably used. These may be used by mixing two or more types with an arbitrary ratio. It is preferable that the organic solvent be used by mixing the cyclic carbonate and the chain carbonate, and from a viewpoint of balance of discharge capacity and cycle characteristic, it is particularly preferable to contain at least two types of ethylene carbonate and diethyl carbonate.

The organic solvent obtained by dissolving the lithium salts is set as a nonaqueous electrolyte, and vanadium of 0.1 ppm to 20 ppm is added to the electrolyte. It is not particularly limited for the vanadium salt and, by adding oxide such as $V_2O_5$, $V_2O_4$, or $V_2O_3$, chloride such as $VCl_3$ or $VCl_4$, phosphate compound such as $LiVOPO_4$ or $VOPO_4$, vanadium acetylacetonate or sodium metavanadate, the vanadium compound is added to the electrolyte. It is considered that the vanadium compound exists in the electrolyte as the vanadium compound or the vanadium ion. The amount of vanadium of 0.1 ppm to 20 ppm is added to the electrolyte in terms of vanadium ions. The amount of 0.1 ppm to 5 ppm is more preferable, and the amount of 0.2 ppm to 2 ppm is even more preferable. In a case where the amount of vanadium is smaller than 0.1 ppm, the amount of gas generation tends to be large. Also, in a case where the amount of vanadium is equal to or more than 20 ppm, the amount of gas generation becomes large.

In the lithium-ion secondary battery according to the embodiment, the compound described below is used for the positive electrode active material. The positive electrode active material is not particularly limited as long as it can reversibly perform intercalation and deintercalation of a lithium-ion, or doping and de-doping of a lithium-ion and counteranion of the lithium-ion (for example, $PF_6^-$), and a well-known electrode active material can be used.

For example, mixed metal oxides such as lithium cobaltate ($LiCoO_2$), lithium nickelate ($LiNiO_2$), lithium manganese spinel ($LiMn_2O_4$), mixed metal oxide expressed as general expression: $LiNi_xCo_yMn_zMn_aO_2$ (x+y+z+a=1, 0≤x≤1, 0≤y≤1, 0≤z≤1, 0≤a≤1, and M is one or more types of elements selected from Al, Mg, Nb, Ti, Cu, Zn, and Cr), lithium vanadium compound ($LiV_2O_5$), olivine-type $LiMPO_4$ (herein, M indicates one or more types of elements selected from Co, Ni, and Mn or Fe, Mg, Nb, Ti, Al, and Zr, or VO), or lithium titanate ($Li_4Ti_5O_{12}$) is used. Among them, it is preferable to use vanadium phosphate which can be expressed with a structural formula of $Li_a(M)_b(PO_4)_cF_d$ (M=VO or V, 0.9≤a≤3.3, 0.9≤b≤2.2, 0.9≤c≤3.3, and 0≤d≤2.0). Particularly, in a case of using $LiVOPO_4$, an excellent effect is obtained. It is considered that vanadium existing in the electrolyte strongly interacts with vanadium in the positive electrode, such that there is an effect of suppressing an active site accompanying with gas generation.

It is known that the vanadium phosphate can be synthesized by solid phase synthesis, hydrothermal synthesis, carbothermal reduction method or the like. Among them, vanadium phosphate manufactured by the hydrothermal synthesis method has a small particle size and tends to be excellent in rate performance, the vanadium phosphate manufactured by the hydrothermal synthesis is preferable as the positive electrode active material. The vanadium phosphate manufactured by the hydrothermal synthesis has a small amount of gas generation. It is assumed that because, in the vanadium phosphate manufactured by the hydrothermal synthesis, a defect is slight and an active site which is a reason of the gas generation is small.

The nonaqueous electrolyte for a lithium-ion secondary battery and the lithium-ion secondary battery according to the embodiment can suppress gas to be generated at the time of charging and discharging. The mechanism thereof is assumed as follows. It is assumed that a part of generated gas is generated due to oxidation decomposition of the electrolyte on the surface of the positive electrode. On the other hand, it is assumed that a part of the vanadium compound contained in the electrolyte adsorbs on the surface of the positive electrode, has an effect of suppressing the active site of the surface of the positive electrode, and suppress oxidation decomposition of the electrolyte.

As shown in FIG. 1, a lithium-ion secondary battery 100 according to the embodiment includes a power generating element 30 including a plate-shaped negative electrode 20 and a plate-shaped positive electrode 10 which are opposed each other and a plate-shaped separator 18 which is disposed to be adjacent between the negative electrode 20 and the positive electrode 10, an electrolyte containing lithium ions, a case 50 which accommodates the electrolyte in a sealed state, a negative electrode lead 62, one end portion of which is electrically connected to the negative electrode 20 and the other end portion of which is protruded to the outside of the case, and a positive electrode lead 60, one end portion of which is electrically connected to the positive electrode 10 and the other end portion of which is protruded to the outside of the case.

The negative electrode 20 includes a negative electrode current collector 22 and a negative electrode active material layer 24 stacked on the negative electrode current collector 22. In addition, the positive electrode 10 includes a positive electrode current collector 12 and a positive electrode active material layer 14 stacked on the positive electrode current collector 12. The separator 18 is positioned between the negative electrode active material layer 24 and the positive electrode active material layer 14.

The positive electrode active material layer 14 contains at least the active material according to the embodiment and a conductive auxiliary agent. As the conductive auxiliary agent, a carbon material such as carbon black, metal powder such as copper, nickel, stainless steel, or iron, a mixture of the carbon material and the metal powder, or conductive oxide such as ITO is used. It is preferable that the carbon material contain carbon having tap density of 0.03 g/ml to 0.09 g/ml and carbon having tap density of 0.1 g/ml to 0.3 g/ml. The positive electrode active material layer may include a binder which adheres the active material and the conductive auxiliary agent. The positive electrode active material layer 14 is formed by a step of applying a coating material including the positive electrode active material, the binder, the solvent, and the conductive auxiliary agent on the positive electrode current collector 12.

As the negative active material included in the negative electrode active material layer 24, a carbon material such as natural graphite, synthetic graphite, hard carbon, soft carbon, or low temperature heat-treated carbon, metal such as Al, Si (Silicon), Sn, or Si which can be synthesized with lithium or alloys thereof, an amorphous compound mainly consisting of oxide such as $SiO_x$ (1<x≤2) (silicon oxide) or $SnO_x$ (1<x≤2), lithium titanate ($Li_4Ti_5O_{12}$), or $TiO_2$ is used, for example. The negative electrode active material may be adhered by the binder. In the same manner as in the case of the positive electrode active material layer 14, the negative electrode active material layer 24 is formed by a step of applying a coating material including the negative electrode active material and the like on the negative electrode current collector 22. Among them, in a case where the silicon or silicon oxide is used as the negative electrode active material, the gas generation is suppressed. It is because that the material which is a reason of the gas generation occurred in the positive electrode is reacted with the silicon. Also, in a case where the silicon or silicon oxide is used by mixing with carbon such as graphite or the like, an effect of suppressing the gas generation is obtained.

In addition, the separator 18 may be formed from a porous structure with an electrical insulating property, and a singlelayer body or a layered body of a film formed of polyethylene, polypropylene, or polyolefin, an extended film of a mixture of the resins described above, or fibrous nonwoven fabric formed of at least one type of constituent material selected from a group formed of cellulose, polyester and polypropylene is used, for example.

The case 50 is a case which hermetically seals the power generating element 30 and the electrolyte therein. The case 50 is not particularly limited, as long as it is a material which can suppress leakage of the electrolyte to the outside or penetration of moisture or the like into the lithium-ion secondary battery 100 from the outside. For example, as the case 50, a metal-laminated film is desirable to be used, from viewpoints of being light weight and having a high degree of freedom in shape.

The leads 60 and 62 are formed of a conductive material such as aluminum.

Hereinabove, the preferred embodiment of the nonaqueous electrolyte for a lithium-ion secondary battery and the lithium-ion secondary battery according to the present invention has been described in detail, however, the present invention is not particularly limited to the embodiment described above.

EXAMPLES

Hereinafter, the present invention will be described in further detail based on Examples and Comparative Examples, however, the present invention is not limited to the Examples described below.

Example 1

Manufacture of Evaluation Cell

A molar ratio of $V_2O_5$, LiOH, and $H_3PO_4$ was set as about 1:2:2, and put in a sealed container and heated at 160° C. for 8 hours, and the obtained paste was fired at 600° C. for 4 hours in air. It was found that the obtained particle as described above was β type $LiVOPO_4$. The $LiVOPO_4$ particle and acetylene black were weighed with a weight ratio of 90:10, and with respect to this, mixing treatment for 3 minutes by planetary ball mill was performed.

A mixture obtained by mixing the mixture obtained as described above and polyvinylidene fluoride (PVDF) which is a binder was dispersed in N-methyl-2-pyrrolidone (NMP) which is a solvent, and thus slurry was prepared. In addition, a weight ratio of the mixture and PVDF in the slurry was adjusted as 90:10. The slurry was applied onto aluminum foil which is a current collector, dried, and then pressed, and thus, an electrode (positive electrode) on which an active material layer was formed, was obtained.

Next, as a negative electrode, N methyl pyrrolidone (NMP) 5 wt % solution of the synthesis graphite and polyvinylidene fluoride (PVDF) were mixed so as to have a ratio of synthesis graphite:polyvinylidene fluoride as 93:7, and thus, a slurry coating material was manufactured. The coating material was applied on copper foil which is a current collector, dried, and pressed, and thus, a negative electrode was manufactured.

The positive electrode and the negative electrode were stacked on each other with a separator formed of a porous polyethylene film interposed therebetween, and a layered body (element assembly) was obtained. The layered body is input to an aluminum-laminated pack.

In the electrolyte, ethylene carbonate (EC) and diethyl carbonate (DEC) were mixed with a volume ratio of 3:7, and $LiPF_6$ was dissolved so as to be 1 mol/L as supporting electrolyte. Vanadium pentoxide ($V_2O_5$) was added thereto so as to be 0.05 ppm. Accordingly, 0.1 ppm of vanadium was added in terms of vanadium ions.

After injecting the electrolyte described above into the aluminum-laminated pack to which the layered body was input, the aluminum-laminated pack was vacuum-sealed, and an evaluation cell of Example 1 was manufactured.

A cell of Example 2 was manufactured by the same method as Example 1 except for adding 0.1 ppm of vanadium pentoxide ($V_2O_5$).

A cell of Example 3 was manufactured by the same method as Example 1 except for adding 0.25 ppm of vanadium pentoxide ($V_2O_5$).

A cell of Example 4 was manufactured by the same method as Example 1 except for adding 0.5 ppm of vanadium pentoxide ($V_2O_5$).

A cell of Example 5 was manufactured by the same method as Example 1 except for adding 1.5 ppm of vanadium pentoxide ($V_2O_5$).

A cell of Example 6 was manufactured by the same method as Example 1 except for adding 2.5 ppm of vanadium pentoxide ($V_2O_5$).

A cell of Example 7 was manufactured by the same method as Example 1 except for adding 10 ppm of vanadium pentoxide ($V_2O_5$).

A cell of Example 8 was manufactured by the same method as Example 2 except for synthesizing $LiVOPO_4$ which is a positive electrode active material by a solid phase method.

A cell of Example 9 was manufactured by the same method as Example 2 except for using ethylene carbonate (EC):diethyl carbonate (DEC):methylethyl carbonate (MEC)=3:4:3 as a solvent of the electrolyte.

A cell of Example 10 was manufactured by the same method as Example 2 except for using ethylene carbonate (EC):dimethyl carbonate (DMC):methylethyl carbonate (MEC)=3:4:3 as a solvent of the electrolyte.

A cell of Example 11 was manufactured by the same method as Example 2 except for using ethylene carbonate (EC):propylene carbonate (PC):dimethyl carbonate (DMC):methylethyl carbonate (MEC)=2:1:4:3 as a solvent of the electrolyte.

A cell of Example 12 was manufactured by the same method as Example 2 except for adding 0.2 ppm of vanadyl sulfate instead of vanadium pentoxide ($V_2O_5$), and using ethylene carbonate (EC):dimethyl carbonate (DMC):methylethyl carbonate (MEC)=3:4:3 as the electrolyte.

A cell of Example 13 was manufactured by the same method as Example 12 except for using sodium vanadate instead of vanadyl sulfate.

A cell of Example 14 was manufactured by the same method as Example 1 except for using $Li_3V_2(PO_4)_3$ which is synthesized by a hydrothermal method as the positive electrode active material and setting an additive amount of vanadium pentoxide ($V_2O_5$) as 0.05 ppm.

A cell of Example 15 was manufactured by the same method as Example 14 except for setting an additive amount of vanadium pentoxide ($V_2O_5$) as 0.5 ppm.

A cell of Example 16 was manufactured by the same method as Example 14 except for setting an additive amount of vanadium pentoxide ($V_2O_5$) as 4 ppm.

A cell of Example 17 was manufactured by the same method as Example 14 except for setting an additive amount of vanadium pentoxide ($V_2O_5$) as 7.5 ppm.

A cell of Example 18 was manufactured by the same method as Example 10 except for using Li(Ni$_{0.33}$Mn$_{0.33}$Co$_{0.33}$)O$_2$ which is synthesized by a solid phase method as the positive electrode active material.

A cell of Example 19 was manufactured by the same method as Example 10 except for using Li(Ni$_{0.8}$Co$_{0.15}$Al$_{0.05}$)O$_2$ which is synthesized by a solid phase method as the positive electrode active material.

A cell of Example 20 was manufactured by the same method as Example 10 except for using LiCoO$_2$ which is synthesized by a solid phase method as the positive electrode active material.

A cell of Example 21 was manufactured by the same method as Example 3 except for using Li$_2$S which is synthesized by a solid phase method as the positive electrode active material.

A cell of Example 22 was manufactured by the same method as Example 8 except for setting an amount of vanadium in the electrolyte as 0.12 ppm.

A cell of Example 23 was manufactured by the same method as Example 8 except for setting an amount of vanadium in the electrolyte as 5 ppm.

As a negative electrode, N methylpyrrolidone (NMP) 20 wt % solution of a mixture of silicon oxide and silicon obtained by mixing with a ratio of 1:1 and polyamide imide (PAI) were mixed so as to have a ratio of total weight of silicon oxide and silicon:total weight of PAI as 90:10, and thus, a slurry coating material was manufactured. The coating material was applied on copper foil which is a current collector, dried, and pressed, and thus, a negative electrode was manufactured. An evaluation cell of Example 24 was manufactured by the same method as Example 1 except for using the negative electrode described above.

An evaluation cell of Example 25 was manufactured by the same method as Example 24 except for setting an amount of vanadium in the electrolyte as 0.2 ppm.

An evaluation cell of Example 26 was manufactured by the same method as Example 24 except for setting an amount of vanadium in the electrolyte as 5 ppm.

As a negative electrode, N methylpyrrolidone (NMP) 20 wt % solution of a mixture of silicon oxide, silicon, and graphite obtained by mixing with a ratio of 0.5:0.5:9 and polyamide imide (PAI) were mixed so as to have a ratio of total weight of silicon oxide, silicon, and graphite:total weight of PAI as 90:10, and thus, a slurry coating material was prepared. The coating material was applied on copper foil which is a current collector, dried, and pressed, and thus, a negative electrode was manufactured. An evaluation cell of Example 27 was manufactured by the same method as Example 1 except for using the negative electrode described above.

An evaluation cell of Example 28 was manufactured by the same method as Example 27 except for setting an amount of vanadium in the electrolyte as 0.2 ppm.

An evaluation cell of Example 29 was manufactured by the same method as Example 27 except for setting an amount of vanadium in the electrolyte as 5 ppm.

An evaluation cell of Comparative Example 1 was manufactured by the same method as Example 1 except for adding 0.025 ppm of vanadium pentoxide (V$_2$O$_5$).

An evaluation cell of Comparative Example 2 was manufactured by the same method as Example 1 except for adding 15 ppm of vanadium pentoxide (V$_2$O$_5$).

Measurement of Amount of Gas Generation

Constant current-constant voltage charging of a cell was performed to 4.15 V with a current rate of 0.1 C. An amount of gas generation in a charging state was acquired by the following method. In measurement of the amount of gas generation, Archimedes method was used. In detail, a cell was dropped in pure water, buoyance was measured, and an amount of gas generation was acquired from volume of the pushed water.

As shown in Table 1, in Examples 1 to 29, it is possible to suppress the gas generation, and in Comparative Examples 1 and 2, it was clear that the effect was not obtained.

TABLE 1

| | | Positive electrode active material | Negative electrode | Synthesis method | Amount of vanadium in electrolyte (ppm) | Electrolyte solvent | Amount of gas generation (%) |
|---|---|---|---|---|---|---|---|
| Example | 1 | LiVOPO$_4$ | graphite | hydrothermal synthesis | 0.12 | EC + DEC(3:7) | 8.1 |
| Example | 2 | LiVOPO$_4$ | graphite | hydrothermal synthesis | 0.2 | EC + DEC(3:7) | 4.2 |
| Example | 3 | LiVOPO$_4$ | graphite | hydrothermal synthesis | 0.5 | EC + DEC(3:7) | 8.8 |
| Example | 4 | LiVOPO$_4$ | graphite | hydrothermal synthesis | 1 | EC + DEC(3:7) | 11.9 |
| Example | 5 | LiVOPO$_4$ | graphite | hydrothermal synthesis | 3 | EC + DEC(3:7) | 15.1 |
| Example | 6 | LiVOPO$_4$ | graphite | hydrothermal synthesis | 5 | EC + DEC(3:7) | 19.6 |
| Example | 7 | LiVOPO$_4$ | graphite | hydrothermal synthesis | 20 | EC + DEC(3:7) | 23.5 |
| Example | 8 | LiVOPO$_4$ | graphite | Solid phase synthesis | 0.2 | EC + DEC(3:7) | 23.5 |
| Example | 9 | LiVOPO$_4$ | graphite | hydrothermal synthesis | 0.2 | EC + DEC + MEC(3:4:3) | 9.8 |
| Example | 10 | LiVOPO$_4$ | graphite | hydrothermal synthesis | 0.2 | EC + DMC + MEC(3:4:3) | 12.6 |
| Example | 11 | LiVOPO$_4$ | graphite | hydrothermal synthesis | 0.2 | EC + PC + DMC + MEC(2:1:4:3) | 10.9 |
| Example | 12 | LiVOPO$_4$ | graphite | hydrothermal synthesis | 0.2 | EC + DMC + MEC(3:4:3) | 3.2 |
| Example | 13 | LiVOPO$_4$ | graphite | hydrothermal synthesis | 0.2 | EC + DMC + MEC(3:4:3) | 2.8 |
| Example | 14 | Li$_3$V$_2$(PO$_4$)$_3$ | graphite | hydrothermal synthesis | 0.12 | EC + DEC(3:7) | 21.4 |
| Example | 15 | Li$_3$V$_2$(PO$_4$)$_3$ | graphite | hydrothermal synthesis | 1 | EC + DEC(3:7) | 22.8 |
| Example | 16 | Li$_3$V$_2$(PO$_4$)$_3$ | graphite | hydrothermal synthesis | 8 | EC + DEC(3:7) | 25.2 |
| Example | 17 | Li$_3$V$_2$(PO$_4$)$_3$ | graphite | hydrothermal synthesis | 15 | EC + DEC(3:7) | 33.3 |
| Example | 18 | Li(Ni$_{0.33}$Mn$_{0.33}$Co$_{0.33}$)O$_2$ | graphite | Solid phase synthesis | 0.2 | EC + DMC + MEC(3:4:3) | 30.8 |
| Example | 19 | Li(Ni$_{0.8}$Co$_{0.15}$Al$_{0.05}$)O$_2$ | graphite | Solid phase synthesis | 0.2 | EC + DMC + MEC(3:4:3) | 28.4 |
| Example | 20 | LiCoO$_2$ | graphite | Solid phase synthesis | 0.2 | EC + DMC + MEC(3:4:3) | 33.3 |
| Example | 21 | Li$_2$S | graphite | Solid phase synthesis | 5 | EC + DEC(3:7) | 39.8 |
| Example | 22 | LiVOPO$_4$ | graphite | Solid phase synthesis | 0.12 | EC + DEC(3:7) | 24.9 |
| Example | 23 | LiVOPO$_4$ | graphite | Solid phase synthesis | 5 | EC + DEC(3:7) | 25.6 |
| Example | 24 | LiVOPO$_4$ | silicon oxide + silicon | hydrothermal synthesis | 0.12 | EC + DEC(3:7) | 5.3 |
| Example | 25 | LiVOPO$_4$ | silicon oxide + silicon | hydrothermal synthesis | 0.2 | EC + DEC(3:7) | 2.8 |

TABLE 1-continued

|  |  | Positive electrode active material | Negative electrode | Synthesis method | Amount of vanadium in electrolyte (ppm) | Electrolyte solvent | Amount of gas generation (%) |
|---|---|---|---|---|---|---|---|
| Example | 26 | LiVOPO$_4$ | silicon oxide + silicon | hydrothermal synthesis | 5 | EC + DEC(3:7) | 10.9 |
| Example | 27 | LiVOPO$_4$ | silicon oxide + silicon + graphite | hydrothermal synthesis | 0.12 | EC + DEC(3:7) | 6.7 |
| Example | 28 | LiVOPO$_4$ | silicon oxide + silicon + graphite | hydrothermal synthesis | 0.2 | EC + DEC(3:7) | 3.5 |
| Example | 29 | LiVOPO$_4$ | silicon oxide + silicon + graphite | hydrothermal synthesis | 5 | EC + DEC(3:7) | 16.8 |
| Comparative Example | 1 | LiVOPO$_4$ | graphite | hydrothermal synthesis | 0.05 | EC + DEC(3:7) | 43.1 |
| Comparative Example | 2 | LiVOPO$_4$ | graphite | hydrothermal synthesis | 30 | EC + DEC(3:7) | 54.6 |

What is claimed is:

1. A lithium-ion secondary battery comprising a positive electrode including LiVOPO$_4$, as the positive electrode active material, a negative electrode which can intercalate and deintercalate lithium, and a nonaqueous electrolyte containing 0.1 ppm to 20 ppm of vanadium in terms of vanadium ions, and containing cyclic carbonate and chain carbonate.

2. The lithium-ion secondary battery according to claim 1, wherein the amount of vanadium in terms of vanadium ions is 0.1 ppm to 5 ppm.

3. The lithium-ion secondary battery according to claim 1, wherein the amount of vanadium in terms of vanadium ions is 0.2 ppm to 2 ppm.

4. The lithium-ion secondary battery according to claim 1, wherein the vanadium is present as a vanadium salt selected from the group consisting of V$_2$O$_5$, V$_2$O$_4$, V$_2$O$_3$, VCl$_3$, VCl$_4$, LiVOPO$_4$, VOPO$_4$, vanadium acetylacetonate and sodium metavanadate.

5. The lithium-ion secondary battery according to claim 1, wherein the cyclic carbonate and chain carbonate are selected from the group consisting of ethylene carbonate:diethyl carbonate in a volume ratio of 3:7, ethylene carbonate:diethyl carbonate:methylethyl carbonate in a volume ratio of 3:4:3, ethylene carbonate:dimethyl carbonate:methylethyl carbonate in a volume ratio of 3:4:3, and ethylene carbonate:propylene carbonate:dimethyl carbonate:methylethyl carbonate in a volume ratio of 2:1:4:3.

* * * * *